Patented Oct. 21, 1952

2,614,907

UNITED STATES PATENT OFFICE 2,614,907

PRODUCTION AND RECOVERY OF HYDROGEN PEROXIDE

Gerhard A. Cook, Snyder, N. Y., assignor, by mesne assignments, to Union Carbide and Carbon Corporation, a corporation of New York No Drawing. Application May 27, 1948, Serial No. 29,671

6 Claims. (Cl. 23—207)

It is known that hydrogen peroxide can be made by oxidizing propane, ethane, or other hydrocarbons under suitable peroxide-forming conditions, such, for example, as are shown in my recently issued Patent No. 2,416,156. Aldehydes, such as formaldehyde and acetaldehyde, are also formed in such a reaction, and while these compounds seem to have very little affinity toward hydrogen peroxide in the vapor phase, their presence in a condensed solution product is difficult to avoid entirely, and will cause a very rapid conversion of the hydrogen peroxide to organic peroxides, in particular hydroxy alkyl peroxides. These organic peroxides, composed largely of hydroxymethyl hydroperoxide, bis-(hydroxymethyl) peroxide, hydroxyethyl hydroperoxide, and bis(hydroxyethyl) peroxide, are very difficult to separate from hydrogen peroxide by the usual extraction and distillation methods, so that when this addition reaction has once taken place, the available yields of pure hydrogen peroxide from a hydrocarbon oxidation can be substantially impaired.

It is an object of this invention to provide a method of recovering improved yields of hydrogen peroxide from solutions initially containing this compound in the presence of aldehydes which are readily reactable therewith. A further object is to provide a practical method of converting organic peroxides to hydrogen peroxide, whereby improved efficiencies in production of the latter compound, as made by thermal oxidation of hydrocarbons, can be obtained.

The invention comprises a two-step process, in which aqueous solutions containing the organic reaction products of aldehydes and hydrogen peroxide are first treated with hydroxides or other compounds of metals which are capable of forming peroxides insoluble in water, and the metal peroxides so formed are then treated with acids to liberate hydrogen peroxide. Alkaline earth metal compounds, in particular calcium and barium hydroxides, will react with organic peroxides to form insoluble metal peroxides, and after filtration and washing, the latter compounds can be made to release hydrogen peroxide by treatment with carbon dioxide and water. Rapid precipitation, filtration, and initial washing of the insoluble metal peroxide are desirable, to avoid further reactions which can readily occur if formaldehyde is present in the solution, and it is further desirable to maintain temperatures preferably below about 20° C. during the precipitation treatment. As applied to the reaction condensates from a hydrocarbon oxidation to produce hydrogen peroxide, the treatment as proposed will substantially increase the final yields of this product, and it will contribute greatly to the commercial economy of such a process.

The following examples will be further illustrative of the invention:

Example 1

A solution typical of those to which this recovery process is applicable was made up, by mixing commercial formalin with an aqueous hydrogen peroxide solution, in proportions to provide one mole of formaldehyde for each mole of hydrogen peroxide, and diluting with water. Twenty milliliters of this solution (containing 0.03 mole of peroxide) was cooled to 0° C., and added rapidly, with vigorous mechanical stirring, to a lime slurry. The lime slurry had been previously cooled to 4° C., and was prepared by suspending 0.037 mole of a pure commercial calcium hydroxide in 80 ml. of water. After completing the mixture, the solution was stirred for an additional 15 seconds, and was immediately filtered on a Buechner funnel. The filtration time required another 12 seconds, and the filter cake was then immediately washed clean with water. Conversion of peroxide in the starting solution to calcium peroxide reached a total of 96.8%, and upon drying at 60° C. for a period of 50 minutes, 2.5% of the peroxide was lost, presumably by decomposition. The dried product contained 81.6% $CaO_2$.

To recover hydrogen peroxide, the calcium peroxide so prepared was suspended in sufficient water to give a slurry containing 0.835 mole $CaO_2$ per liter. While the slurry was vigorously agitated at 25° C., a rapid stream of $CO_2$ was passed through it for a period of three hours. The solution was then filtered, and in the filtrate, 89.8% of the starting peroxide was recovered as $H_2O_2$, in a concentration of 2.5 grams per 100 ml. of solution. Unreacted $CaO_2$ in the filter cake amounted to 4.0%, the balance apparently being lost by decomposition.

Example 2

An aqueous solution obtained by scrubbing the gases from a reactor operating under peroxide-forming conditions on a mixture of propane, oxygen and recycle gases (propylene, ethylene, carbon monoxide, etc.) was analyzed, and found to contain 1.06 moles total peroxides, 0.41 mole total aldehydes (mostly formaldehyde and acetaldehyde) and 0.30 mole total acid (mostly formic and acetic acids) per liter. This solution, in an amount of 1060 ml., was added to a slurry of 1.3 moles of Ca(OH)$_2$ in 1300 ml. of water at 8° C. The addition took five minutes, and clean ice was added to the reaction mixture to keep the temperature below 10° C. The precipitate was then filtered off and washed three times, being dispersed each time in 800 ml. of dilute clear lime water. After drying in air at 72° C. for a period of about 14 hours, 115 grams of dried product was obtained. This contained 61.5% by weight CaO$_2$, indicating a peroxide recovery from the initial solution of 89.2%.

Hydrogen peroxide was then regenerated by suspending the dried calcium peroxide in water, and introducing carbon dioxide gas into the suspension. The calcium carbonate formed was filtered off, and the resulting solution was concentrated by evaporation in vacuo until it contained 21 grams of H$_2$O$_2$ per 100 ml. of solution. Simple concentration by evaporation usually leaves a small amount of calcium carbonate in the solution, because of the slight solubility of this compound in water, and for greater purity in the product, the peroxide may be distilled off, leaving all of the calcium carbonate behind. By appropriate distillation, solutions having a concentration of over 90% peroxide have been obtained.

Modifications over the exact procedure of the above examples, which will be apparent to those skilled in the art, include the use of compounds of metals other than calcium and barium to precipitate insoluble metal peroxide. Examples of these are salts of uranium and thorium, which will function as intended, although economically such compounds may not be as practical as the hydroxides of calcium and barium. Almost any inorganic acid soluble in water can be used to liberate the hydrogen peroxide from the metal peroxide, but acids like carbonic (CO$_2$) and sulfuric are preferred, because they form insoluble salts with metals such as calcium and barium, thus permitting separation from the aqueous hydrogen peroxide by simple filtration. Where the acid used may form a soluble salt, e. g. HCl, the hydrogen peroxide can usually be separated from the salt component by distillation or extraction. The proportions of the reactants do not appear critical, although a slight excess over stoichiometric amounts of the metal precipitant is usually desirable for more complete recovery. Large excesses should be avoided, as this may cause unnecessary contamination of the precipitated metal peroxide, and, at the same time, require too large amounts of acid to completely liberate the hydrogen peroxide.

I claim:

1. Process of recovering hydrogen peroxide from an aqueous solution initially containing said hydrogen peroxide and aldehydes readily reactable to organic peroxides, which comprises adding to said solution an alkaline earth metal hydroxide which precipitates the organic peroxides as corresponding metal peroxide, separating the alkaline earth metal peroxide from the solution, and releasing hydrogen peroxide from said metal peroxide by treating with acid and aqueous suspension of the latter compound.

2. Process of recovering hydrogen peroxide from an aqueous solution initially containing said hydrogen peroxide and aldehydes readily reactable to organic peroxides, which comprises adding calcium hydroxide to said solution which converts all organic peroxides to calcium peroxide, separating the calcium peroxide from the solution, and releasing hydrogen peroxide from said calcium peroxide by treating an aqueous suspension of the latter compound with carbon dioxide.

3. Process of recovering hydrogen peroxide from an aqueous solution initially containing said hydrogen peroxide and aldehydes readily reactable to organic peroxides, which comprises adding barium hydroxide to said solution which converts all organic peroxides to barium peroxide, separating the barium peroxide from the solution, and releasing hydrogen peroxide from said barium peroxide by treating an aqueous suspension of the latter compound with carbon dioxide.

4. In the production of hydrogen peroxide by thermal oxidation of hydrocarbons, means for recovering improved yields of hydrogen peroxide from the aqueous condensate solution of the reaction products containing organic peroxide, which comprises adding to said condensate solution an alkaline earth metal hydroxide which precipitates the organic peroxides as corresponding metal peroxide, separating the alkaline earth metal peroxide from the solution, and releasing hydrogen peroxide from said metal peroxide by treating with acid an aqueous suspension of the latter compound.

5. In the production of hydrogen peroxide by thermal oxidation of hydrocarbons, means for recovering improved yields of hydrogen peroxide from the aqueous condensate solution of the reaction products containing organic peroxides, which comprises adding calcium hydroxide to said condensate solution which converts all organic peroxides to calcium peroxide, separating the calcium peroxide from the solution, and releasing hydrogen peroxide from said calcium peroxide by treating an aqueous suspension of the latter compound with carbon dioxide.

6. In the production of hydrogen peroxide by thermal oxidation of hydrocarbons, means for recovering improved yields of hydrogen peroxide from the aqueous condensate solution of the reaction products containing organic peroxides, which comprises adding barium hydroxide to said condensate solution which converts all organic peroxides to barium peroxide, separating the barium peroxide from the solution, and releasing hydrogen peroxide from said barium peroxide by treating an aqueous suspension of the latter compound with carbon dioxide.

GERHARD A. COOK.

REFERENCES CITED

The following references are of record in the file of this patent:

UNITED STATES PATENTS

| Number | Name | Date |
|---|---|---|
| 1,235,664 | Doerner | Aug. 7, 1917 |
| 2,403,709 | Dickey et al. | July 9, 1946 |
| 2,430,864 | Farkas et al. | Nov. 18, 1947 |
| 2,443,503 | Harris | June 15, 1948 |

FOREIGN PATENTS

| Number | Country | Date |
|---|---|---|
| 14,489 | Great Britain | of 1906 |